United States Patent

Seelert et al.

[11] Patent Number: 5,278,232
[45] Date of Patent: Jan. 11, 1994

[54] MOLDING COMPOSITIONS OF A STYRENE POLYMER, A POLYOLEFIN AND A TRIBLOCK STYRENIC COPOLYMER

[75] Inventors: Stefan Seelert, Frankenthal; Hans Hoenl, Obersuelzen; Bertram Ostermayer, Heidelberg; Andreas Jung, Mannheim; Peter Klaerner, Battenberg, all of Fed. Rep. of Germany

[73] Assignee: Base Aktiengesellschaft, Ludwigshafen, Fed. Rep. of Germany

[21] Appl. No.: 983,330

[22] Filed: Nov. 30, 1992

[30] Foreign Application Priority Data

Dec. 3, 1991 [DE] Fed. Rep. of Germany ....... 4139827

[51] Int. Cl.$^5$ .................. C08L 53/02; C08L 51/00; C08L 23/00
[52] U.S. Cl. ........................ 525/71; 525/70; 525/88; 525/95; 525/98; 525/99
[58] Field of Search ............... 525/98, 99, 95, 314, 525/271, 71

[56] References Cited

U.S. PATENT DOCUMENTS

| | | | |
|---|---|---|---|
| 4,031,166 | 1/1985 | Collins | 525/98 |
| 4,495,323 | 6/1977 | Bronstert | 525/98 |
| 4,699,938 | 10/1987 | Minamizaki et al. | 525/98 |
| 4,939,208 | 7/1990 | Lanza et al. | 525/98 |

FOREIGN PATENT DOCUMENTS

| | | |
|---|---|---|
| 042153 | 12/1981 | European Pat. Off. . |
| 060524 | 9/1982 | European Pat. Off. . |
| 125227 | 11/1984 | European Pat. Off. . |
| 310051 | 10/1987 | European Pat. Off. . |
| 328956 | 8/1989 | European Pat. Off. . |
| 329283 | 8/1989 | European Pat. Off. . |
| 402340 | 12/1990 | European Pat. Off. . |
| 421359 | 4/1991 | European Pat. Off. . |
| 437745 | 7/1991 | European Pat. Off. . |
| 2003916 | 8/1971 | Fed. Rep. of Germany . |
| 2112267 | 6/1972 | France . |

*Primary Examiner*—James J. Seidleck
*Assistant Examiner*—M. L. Warzel
*Attorney, Agent, or Firm*—Keil & Weinkauf

[57] ABSTRACT

A thermoplastic molding material contains, in each case based on the sum of the constituents A, B and C, A: 10 to about 90% by weight of a styrene polymer A, B: 10 to about 90% by weight of a polyolefin B, and C: 1 to 20% by weight of an unsymmetrical linear three-block copolymer C of the structure $S_1$-D-$S_2$, prepared by anionic polymerization from styrene and butadiene and/or isoprene, $S_1$ and $S_2$ each denoting a polystyrene block and D denoting a polydiene block, wherein the three-block copolymer C has a styrene content, based on C, of from 50 to 85% by weight and the terminal blocks $S_1$ and $S_2$ built up from styrene differ by at least 50% in their molecular weight.

12 Claims, No Drawings

MOLDING COMPOSITIONS OF A STYRENE POLYMER, A POLYOLEFIN AND A TRIBLOCK STYRENIC COPOLYMER

Polystyrenes and polyolefins are polymers that are not miscible with one another at the molecular level. If such mixtures are to be prepared having favorable product properties, further polymers must therefore be added. Polymer mixtures having the good stress cracking resistance and the good water vapor impermeability of the polyolefins combined with the good processability of the polystyrenes are obtained by adding compatibilizers.

Reported compatibilizers are for example block copolymers of the type X-Y and X-Y-X disclosed in DE-C 2 003 916, where X is an aromatic vinyl compound and Y is a diene hydrocarbon, and the copolymer may be completely or partially hydrogenated. Styrene-butadiene-styrene three-block copolymers are also described as compatibilizers in EP 42 153.

EP 60 524 discloses mixtures of polypropylene and impact-resistant polystyrene with a linear S-(D-S)$_n$ block copolymer, where S is styrene, D is butadiene or isoprene and n is an integer. Blends of HDPE and impact-resistant polystyrene with a S-(D-S)$_n$ block copolymer are mentioned in EP 60 525, where again S is styrene and n is an integer, but D is isoprene or hydrogenated butadiene. According to the disclosures in these printed specifications, the styrene content of the block copolymers should in each case be restricted to less than 50% by weight.

The aforementioned block copolymers are linear. In addition, star-shaped block copolymers composed of butadiene and styrene are reported as compatibilizers in blends of impact-resistant polystyrene and polyolefins in EP 125 227, 310 051, 329 283, 421 359 and U.S. Pat. No. 4 495 323.

Another way of preparing blends of polystyrene and polyolefins having improved product properties is to use mixtures of block copolymers as compatibilizers. Relevant details are given in EP 402 340.

The thermoplastic molding materials prepared by mixing polystyrenes and polyolefins should as far as possible be universally useable, i.e. it should not only be possible to prepare moldings having good properties by thermoforming, for foodstuff packagings for example, but moldings fabricated by injection molding should also have an adequate toughness. However, a feature of the mixtures of polystyrene and polyolefins prepared using the aforementioned block copolymers as compatibilizers is that they still have disadvantages as regards toughness, especially in the case of injection molding applications.

It is accordingly an object of the present invention to develop molding materials having a good stress cracking resistance, good water vapor impermeability and good processability combined with improved toughness, especially in injection molding applications.

We have found that this object is achieved by molding materials based on polymers containing styrene and/or substituted styrene, polyolefins and, as compatibilizers, unsymmetrical block copolymers having a styrene content of from 50 to 85% by weight.

The immediate subject matter of the invention is a thermoplastic molding material containing, in each case based on the sum of A, B and C, A: at least 10 to about 90% by weight of a polymer A containing styrene and/or substituted styrene,
B: at least 10 to about 90% by weight of a polyolefin B, and
C: 1 to 20% by weight of an unsymmetrical linear three-block copolymer C of the structure S$_1$-D-S$_2$, prepared by anionic polymerization from styrene and butadiene and/or isoprene, S$_1$ and S$_2$ each denoting a polystyrene block and D denoting a polydiene block, wherein according to the invention the three-block copolymer has a styrene content, based on C, of from 50 to 85% by weight and the terminal blocks S$_1$ and S$_2$ built up from styrene differ in their molecular weight by at least 50%.

Possible styrene polymers A include both homopolymers and copolymers of styrene and/or substituted styrenes. Substituted styrenes are preferably methyl-substituted styrenes in which a methyl radical is present as substituent in the aromatic ring or in the side chain. p-Methylstyrene and α-methylstyrene should be mentioned in particular in this connection. The homopolymers and copolymers can be prepared in a conventional manner by bulk, solution or suspension polymerization.

As the styrene polymer A, impact-modified styrene polymers are also suitable. These graft copolymers are prepared by polymerizing styrene and/or substituted styrenes in the presence of a rubber. Suitable natural or synthetic rubbers are used for the impact modification of styrene polymers. Suitable rubbers within the scope of the invention include, besides natural rubber, for example polybutadiene, polyisoprene and copolymers of butadiene and/or isoprene with styrene and other comonomers having a glass transition temperature of below −20° C. (according to K. H. Illers and H. Breuer, Kolloidzeitschrift 176 (1961), p. 110). Particularly suitable are butadiene polymers having a 1,4-cis content of from 25 to 99% by weight. Acrylic rubbers, EPDM rubbers, polybutylene and polyoctenamer rubbers may however also be used. The rubber grafted with styrene (soft phase) is present in a finely dispersed form in the polystyrene phase, usually termed the hard matrix. The rubber content may vary from 3 to 25% by weight, preferably from 5 to 15% by weight, based on A.

Processes for preparing styrene polymers are known and are described for example in "Ullmanns Encyklopä die der technischen Chemie", 4th edition, Vol. 19, pp. 265 to 295, Verlag Chemie, Weinheim or H. Gerrens, Chem. Ing. Techn. 52 (1980), 477.

Polystyrenes, substituted polystyrenes and impact-modified polystyrenes are commercially available. The viscosity number of the styrene polymers A, and in the case of the impact-modified polystyrenes, of the rigid matrix, should be from 50 to 130 ml/g (measured in a 0.5% strength solution in toluene at 23° C.). The proportion of the polymer A in the molding material according to the invention is at least 10, and preferably from 30 to 80% by weight. If it is important that the molding material is particularly tough, the proportion is preferably from 50 to 80% by weight.

Suitable as polyolefin B are homopolymers or copolymers of propylene and ethylene. A suitable polyolefin is for example polypropylene, which can be prepared for example by the gas-phase process and has a melt flow index (MFI 190/5) of from 0.1 to 90 g/10 minutes. Preference is given to polyethylene prepared by the high-pressure, medium-pressure or low-pressure process and having a density of from 0.91 to 0.97 g/cm$^3$; also suitable are copolymers of ethylene with for example vinyl esters such as vinyl acetate or vinyl propionate, with acrylic esters, or with propylene. The comonomer content of the ethylene copolymers is for example from 1 to 65% by weight, preferably from 10 to 45% by weight. The melt flow index of the ethylene polymers may be chosen within a wide range and is preferably from 0.5 to 40 g/10 minutes (MFI 190/216). A preferred polyolefin is high density polyethylene (range from 0.94 to 0.97 g/cm$^3$) prepared by the Phillips process (medium-pressure process). Another preferred polyolefin is linear low-density polyethylene (range from 0.91 to 0.9 g/cm$^3$) prepared by the gas-phase process. Filler-containing polyethylene should also be mentioned; in this case the preferred filler is calcium carbonate, which occurs in the form of chalk and particularly preferably has a mean particle diameter of 0.1 to 20 μm.

The polyolefin B content in the molding material according to the invention should be at least 10, preferably from 30 to 80% by weight. Tough molding materials have a B content of preferably 20 to 50% by weight. Polyolefin-rich molding materials, i.e. those that have a content of 50% by weight or more (for example up to about 90% by weight), on the other hand have a particularly favorable stress cracking resistance and impermeability to water vapor.

The block copolymer C is an unsymmetrical linear block copolymer of the structure $S_1$-D-$S_2$ prepared by anionic polymerization from styrene and butadiene or isoprene, and having a styrene content of from 50 to 85% by weight, based on C. In the above structure D are blocks containing one or more butadiene or isoprene units. The terminal blocks $S_1$ and $S_2$ are built up from styrene and differ in their molecular weight by at least 50%, i.e. the ratio of $S_2$ to $S_1$ is at least 1.5. Block copolymers are preferably used in which the molecular weight of $S_2$ is at least twice as large as that of $S_1$.

The molecular weight of the block copolymers C is from 30,000 to 300,000, preferably from 50,000 to 200,000, and in particular from 80,000 to 120,000.

The preparation of block copolymers by anionic polymerization is generally known, and as a rule is carried out in organic solvents using organolithium compounds in the range from $-20°$ to $100°$ C. at pressures sufficient to ensure the existence of a liquid phase. The transitions between the individual blocks may be sharp or tapered.

Sharp transitions are obtained if the anionic polymerization of the monomers is performed in a stepwise manner. Block copolymers with tapered transition between the blocks can be prepared for example according to DE 14 20 689 or DE 15 95 296. As a rule, first of all the styrene block $S_1$ is anionically polymerized. The following preparation of the block D may be performed in several ways. For example, after the completed polymerization of $S_1$ the amount of butadiene or isoprene and styrene required for the preparation of the blocks D and $S_2$ may be added together. The more reactive butadiene or isoprene then first of all polymerizes, followed by the styrene, with the formation of the block $S_2$. With this procedure a tapered transition region in which butadiene or isoprene and styrene are randomly incorporated into the chain is formed between the butadiene or isoprene block and the block $S_2$. The transition region counts as part of block D.

It is also possible to carry out the preparation of the block copolymer C in a stepwise manner. After completed polymerization of $S_1$, butadiene and/or isoprene can then first be added and, after the latter has fully polymerized, the remaining amount of styrene is added for the polymerization of the block $S_2$. It is also possible, following the polymerization of $S_1$, to add a mixture of butadiene and/or isoprene and styrene in order to prepare a random styrene-butadiene/isoprene block in the presence of suitable compounds, for example ethers or tertiary amines. Following this the block $S_2$ must also be polymerized. It is furthermore possible to prepare also the block D in a stepwise manner. Such a process is described in EP 270 515, in which process $S_1$ is first of all polymerized. A block comprising butadiene and/or isoprene and styrene is the second block to be polymerized, followed by a block randomly built up from butadiene and/or isoprene and styrene, and lastly the block $S_2$ is polymerized. The block comprising butadiene and/or isoprene and the block randomly built up from butadiene and/or isoprene and styrene then together form the block D of the component C.

The block copolymers may if desired be selectively completely or partially hydrogenated, only the double bonds derived from the butadiene and/or isoprene monomer building blocks being saturated. Such processes are also known and may be performed for example according to the details given in DE-A 27 48 884.

In the polymerization of the block copolymers C it is also possible to use, instead of styrene, a mixture of styrene and substituted styrenes. Preferred substituted styrenes are methyl-substituted styrenes and, in particular, p-methylstyrene or α-methylstyrene.

The molding material according to the invention may contain auxiliaries or additives that are conventional and customary for the components A, B and C, in order further to improve the properties. These additives include for example heat stabilizers, light stabilizers, lubricanss or mold release agents, lubricating agents, antistats, colorants such as dyes or pigments, flameproofing agents or reinforcing materials with the exception of chalk. The additives may be added during the mixing of A, B and C, though they may also be present already in A, B or C.

The molding materials are prepared by mixing the components according to any known method. The mixing of the components is preferably carried out at elevated temperatures, for example in the melt, by conjoint rolling, kneading or extrusion in a single-screw or twin-screw extruder.

The parameters used to characterize the mixtures were measured as follows:

The yield point and percentage elongation at break according to DIN 53 455.

The modulus in tension according to DIN 53 457.

The multiaxial toughness in terms of the total penetration energy (total work $W_{total}$) according to DIN 53 443.

The viscosity number (VN) according to DIN 51 562 Part 1, under the conditions specified in each case.

The average molecular weight $M_w$ determined by gel permeation chromatography using a combination of Utrastyragel columns and THF as eluent against a calibration with polystyrene standards.

Further details are given with the respective mixing components.

EXAMPLES

The following constituents were used for the preparation of the molding materials according to the invention and the preparation of the comparative materials:

Component A

A Impact-resistant polystyrene having a polybutadiene content of 8%, a median particle diameter ($d_{50}$ of the cumulative weight distribution) of 2.7 μm, containing 0.12% by weight of a sterically hindered phenol as antioxidant. The VN of the hard matrix is 70 ml/g (0.5% in toluene at 23° C.).

Component B

B1 LLDPE Lupolen L 3020 GN from BASF AG (density 0.930 g/cm³ according to DIN 53 479; MFI (190/2.16) of from 0.9 to 1.2 g/10 minutes according to DIN 53 735).

B2 HDPE Lupolen 5661 B from BASF AG (density 0.956 g/cm³ according to DIN 53 479; MFI (190/21.6) of from 8 to 11 g/10 minutes according to DIN 53 735).

Component C

C1 A three-block copolymer built up from styrene and butadiene and having the structure $S_1$-D-$S_2$, with a total of 74% by weight of a styrene and a $M_w$ of 100,000, the $M_w$ of $S_1$ being 16,000, in which there is a tapered transition between the butadiene block and $S_2$ and the ratio of $S_2$ to $S_1$ is 3.3.

C2 A three-block copolymer built up from styrene and butadiene and having the structure $S_1$-D-$S_2$, with a total of 65% by weight of styrene and a $M_w$ of 80,000, the $M_w$ of $S_1$ being 13,000, in which there is a tapered transition between the butadiene block and $S_2$ and the ratio of $S_2$ to $S_1$ is 2.2.

C3 A three-block copolymer built up from styrene and butadiene and having the structure $S_1$-D-$S_2$, with a total of 58% by weight of styrene and a $M_w$ of 100,000, the $M_w$ of $S_1$ being 16,000, in which there is a tapered transition between the butadiene block and $S_2$ and the ratio of $S_2$ to $S_1$ is about 2.0.

C4 Finaclear® 520, commercially available three-block copolymer from Fina and having the structure $S_1$-D-$S_2$, with a total of 72% by weight of styrene and a $M_w$ of 90,000, the $M_w$ of $S_1$ being 14,000 and the $M_w$ of $S_2$ being 38,000.

C5 A symmetrical three-block copolymer of the structure $S_1$-D-$S_1$ with a total of 70% by weight of styrene and a $M_w$ of 100,000, the $M_w$ of the blocks $S_1$ being in each case 25,000, and D being present in the form of a block randomly built up from styrene and butadiene, for comparative purposes.

C6 A mixture of a polymodally composed star block copolymer with about 75% by weight of styrene and 25% by weight of butadiene according to the details given in DE-A 25 50 227 with a $M_w$ of 200,000, and a polymodally composed star block copolymer with about 40% by weight of styrene and 60% by weight of butadiene with a $M_w$ of 150,000, in the ratio of 1:1, likewise for comparative purposes.

C7 Cariflex® TR 1101, a commercially available three-block copolymer from Shell, with a total of 30% by weight of styrene and a $M_w$ of 92,000, likewise for comparative purposes.

AUXILIARIES AND ADDITIVES

The constituents were in each case formed into a premixture together with the component A, a commercially available, sterically hindered phenol (Irganox® 1076 from Ciba-Geigy) being used as antioxidant.

The compounded molding material was mixed in a ZSK 30 twin-screw extruder from Werner & Pfleiderer at 210° C. with a throughput of 10 kg/hour. The properties of the molding material were determined on moldings pressed at 200° C. and injection molded at 230° C.

The values given in Tables 1 to 3 show that the toughness (elongation at break and multiaxial toughness) of the molding materials according to the invention, in particular of injection-molded parts, is better than that of the comparative materials, without any deterioration in the rigidity (modulus in tension, yield point).

TABLE 1

|  |  | Example | | | | Comparative test | | |
|---|---|---|---|---|---|---|---|---|
|  |  | 1 | 2 | 3 | 4 | V1 | V2 | V3 |
| Component | [% by weight] | A 53 | A 53 | A 53 | A 53 | A 53 | A 53 | A 53 |
| Component | [% by weight] | B1 41 | B1 41 | B1 41 | B1 41 | B1 41 | B1 41 | B1 41 |
| Component | [% by weight] | C1 6 | C2 6 | C3 6 | C4 6 | C5 6 | C6 6 | C7 6 |
| Modulus in tension, pressed | [N/mm²] | 790 | 710 | 700 | 750 | 720 | 690 | 630 |
| Yield point, pressed | [N/mm²] | 18 | 16 | 16 | 18 | 17 | 16 | 14 |
| Elongation at break, pressed | [%] | 57 | 88 | 77 | 70 | 42 | 37 | 8 |
| Total penetration energy, pressed | [Nm] | 27 | 32 | 32 | 28 | 15 | 16 | 5 |
| Modulus in tension, injection molded | [N/mm²] | 1230 | 1200 | 1180 | 1230 | 1210 | 1150 | 1080 |
| Yield point, injection molded | [N/mm²] | 24 | 23 | 23 | 25 | 24 | 23 | 22 |
| Elongation at break, injection molded | [%] | 85 | 90 | 95 | 89 | 42 | 53 | 24 |
| Total penetration energy, injection molded | [Nm] | 28 | 31 | 30 | 28 | 13 | 17 | 6 |

TABLE 2

|  |  | Example 5 | Comparative test V4 |
|---|---|---|---|
| Component | [% by weight] | A 63 | A 63 |
| Component | [% by weight] | B1 25 | B1 25 |
| Component | [% by weight] | C4 12 | C6 12 |
| Modulus in tension, pressed | [N/mm²] | 1140 | 1060 |
| Yield point, pressed | [N/mm²] | 24 | 21 |
| Percentage elongation at break, pressed | [%] | 103 | 72 |
| Total penetration energy, pressed | [Nm] | 43 | 28 |

TABLE 3

|  |  | Example | | | | Comparative test | |
|---|---|---|---|---|---|---|---|
|  |  | 6 | 7 | 8 | 9 | V5 | V6 |
| Component | [% by weight] | A 53 | A 53 | A 53 | A 53 | A 53 | A 53 |
| Component | [% by weight] | B2 41 | B2 41 | B2 41 | B2 41 | B2 41 | B2 41 |
| Component | [% by weight] | C1 6 | C2 6 | C3 6 | C4 6 | C5 6 | C6 6 |
| Modulus in tension, pressed | [N/mm$^2$] | 1340 | 1170 | 1170 | 1300 | 1210 | 1000 |
| Yield point, pressed | [N/mm$^2$] | 23 | 20 | 20 | 22 | 20 | 19 |
| Elongation at break, pressed | [%] | 27 | 39 | 34 | 25 | 22 | 22 |
| Total penetration energy, pressed | [Nm] | 15 | 19 | 17 | 14 | 14 | 13 |
| Modulus in tension, injection molded | [N/mm$^2$] | 1580 | 1490 | 1440 | 1600 | 1520 | 1410 |
| Yield point, injection molded | [N/mm$^2$] | 31 | 30 | 29 | 31 | 29 | 29 |
| Elongation at break, injection molded | [%] | 55 | 68 | 68 | 63 | 39 | 32 |
| Total penetration energy, injection molded | [Nm] | 9 | 13 | 9 | 11 | 5 | 5 |

We claim:

1. A thermoplastic molding material containing, in each case based on the sum of the constituents A, B and C, A: 10–90% by weight of a styrene polymer A,
B: 10–90% by weight of a polyolefin B, and
C: 1 to 20% by weight of an unsymmetrical linear three-block copolymer C of the structure $S_1$-D-$S_2$, prepared by anionic polymerization from styrene and butadiene and/or isoprene, $S_1$ and $S_2$ each denoting a polystyrene block and D denoting a polydiene block, wherein the three-block copolymer C has a styrene content, based on C, of from 50 to 85% by weight, the three-block copolymer having a molecular weight between 30,000 and 300,000, the ratio of the molecular weight of $S_2$ to the molecular weight of $S_1$ being at least 1.5:1.

2. A molding material as claimed in claim 1, wherein polyolefin B is polyethylene.

3. A molding material as claimed in claim 2, wherein polyolefin B is filler-containing polyethylene.

4. A molding material as claimed in claim 2, wherein polyolefin B is high density polyethylene (HDPE).

5. A molding material as claimed in claim 2, wherein polyolefin B is low density polyethylene (LDPE).

6. A molding material as claimed in claim 3, wherein polyolefin B is linear low density polyethylene (LLDPE).

7. A molding material as claimed in claim 1, wherein polyolefin B is polypropylene.

8. A molding material as claimed in claim 1, wherein the styrene polymer A is impact-resistant polystyrene.

9. A molding material as claimed in claim 1, containing in each case 30 to 80% by weight of A and B.

10. A molding material as claimed in claim 1, containing 50 to 80% by weight of A and 20 to 50% by weight of B.

11. A molding material as claimed in claim 1, containing, based on 100 parts of A+B+C, 0.05 to 50 parts by weight of conventional additives.

12. A method of using a thermoplastic molding material as claimed in claim 1 for producing molded parts.

* * * * *

UNITED STATES PATENT AND TRADEMARK OFFICE
CERTIFICATE OF CORRECTION

PATENT NO. : 5,278,232
DATED : January 11, 1994
INVENTOR(S) : SEELERT et al.

It is certified that error appears in the above-indentified patent and that said Letters Patent is hereby corrected as shown below:

On the Title Page: , in the assignee information, "Base Aktiengesellschaft" should be --BASF Aktiengesellschaft--.

Signed and Sealed this

Twenty-third Day of August, 1994

Attest:

BRUCE LEHMAN

Attesting Officer          Commissioner of Patents and Trademarks